United States Patent
Zimmermann et al.

(10) Patent No.: US 9,855,672 B2
(45) Date of Patent: Jan. 2, 2018

(54) HANDHELD WORK APPARATUS

(71) Applicant: Andreas Stihl AG & Co. KG, Waiblingen (DE)

(72) Inventors: Helmut Zimmermann, Berglen (DE); Carel Karrar, Stuttgart (DE); Benjamin Frey, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 57 days.

(21) Appl. No.: 14/875,158

(22) Filed: Oct. 5, 2015

(65) Prior Publication Data
US 2016/0107326 A1    Apr. 21, 2016

(30) Foreign Application Priority Data
Oct. 15, 2014   (DE) .......................... 10 2014 015 578

(51) Int. Cl.
| | |
|---|---|
| *B27B 17/12* | (2006.01) |
| *F16N 21/00* | (2006.01) |
| *F16N 39/04* | (2006.01) |
| *F16N 11/04* | (2006.01) |

(52) U.S. Cl.
CPC .............. *B27B 17/12* (2013.01); *F16N 11/04* (2013.01); *F16N 21/00* (2013.01); *F16N 39/04* (2013.01)

(58) Field of Classification Search
CPC .......... F16N 11/04; F16N 21/00; F16N 39/04; B27B 17/00; B27B 17/02; B27B 17/12
USPC .................................................. 30/381–387
See application file for complete search history.

(56) References Cited

U.S. PATENT DOCUMENTS

| | | | | |
|---|---|---|---|---|
| 1,998,682 A | * | 4/1935 | McCann ................. | B62J 31/00 184/15.1 |
| 2,355,003 A | * | 8/1944 | McCann ................. | B62J 31/00 474/91 |
| 2,813,599 A | * | 11/1957 | Amberg .................. | B62J 31/00 474/91 |
| 2,909,937 A | * | 10/1959 | Williams ................ | F16H 57/05 474/91 |
| 4,016,956 A | * | 4/1977 | Karlsson ................ | B23Q 11/10 184/15.1 |
| 4,194,413 A | * | 3/1980 | Hentze ................... | B62J 13/00 474/91 |
| 4,593,923 A | * | 6/1986 | Thalmann ............... | B62J 31/00 184/15.1 |
| 4,891,037 A | * | 1/1990 | Maples .................. | B62J 31/00 184/15.1 |

(Continued)

FOREIGN PATENT DOCUMENTS

| | | | |
|---|---|---|---|
| CA | 2699199 A1 * | 10/2011 | ............. F16H 57/05 |
| DE | 10 2009 034 710 A1 | 11/2010 | |

(Continued)

*Primary Examiner* — Jason Daniel Prone
(74) *Attorney, Agent, or Firm* — Walter Ottesen, P.A.

(57) ABSTRACT

A handheld work apparatus has a drive motor which drives a tool of the work apparatus. A lubricating arrangement is provided for the tool. The lubricating arrangement includes a lubricant piece that is solid at 20° C. The work apparatus has a melting chamber into which the lubricant piece projects and which is connected to the tool via at least one lubricant channel. The melting chamber is delimited at least partially by a heat conducting element which is heated during operation of the work apparatus.

16 Claims, 9 Drawing Sheets

(56) References Cited

U.S. PATENT DOCUMENTS

| | | | | |
|---|---|---|---|---|
| 5,213,180 A * | 5/1993 | Masonek | ................ | B62J 31/00 184/15.1 |
| 5,785,152 A * | 7/1998 | Fujita | ................ | F16C 1/24 184/15.1 |
| 6,070,697 A * | 6/2000 | Millard | ................ | F16N 7/12 184/15.1 |
| 6,245,722 B1 * | 6/2001 | Maples | ................ | C10M 107/50 508/208 |
| 7,108,104 B2 * | 9/2006 | Mitrovich | ................ | B61K 3/02 184/15.1 |
| 7,261,223 B2 * | 8/2007 | Tilley | ................ | B23D 59/02 83/169 |
| 7,424,879 B2 * | 9/2008 | Schlauch | ................ | B27B 17/00 30/381 |
| 7,806,107 B2 * | 10/2010 | Knauβ | ................ | F02M 37/0017 30/381 |
| 7,823,754 B1 * | 11/2010 | Tilley | ................ | B23D 59/02 83/169 |
| 8,573,362 B2 * | 11/2013 | Nagele | ................ | B62J 31/00 184/15.1 |
| 8,771,119 B2 * | 7/2014 | Tanaka | ................ | C10M 119/02 184/15.1 |
| 9,498,895 B2 * | 11/2016 | Harer | ................ | B23D 59/006 30/381 |
| 2002/0014372 A1 * | 2/2002 | Edlund | ................ | B27B 17/12 184/15.1 |
| 2010/0276229 A1 * | 11/2010 | Winckler | ................ | B08B 3/022 184/15.1 |
| 2015/0306783 A1 * | 10/2015 | Yamaoka | ................ | F04B 53/16 83/169 |
| 2017/0021523 A1 * | 1/2017 | Haney | ................ | B27B 17/12 83/800 |

FOREIGN PATENT DOCUMENTS

| | | | | |
|---|---|---|---|---|
| DE | 102014015578 A1 * | 4/2016 | ............ | F16N 11/04 |
| EP | 2199193 A1 * | 6/2010 | ............ | B62J 31/00 |
| EP | 3009243 A1 * | 4/2016 | ............ | F16N 11/04 |
| JP | 58143914 A * | 8/1983 | ............ | B23D 49/162 |
| JP | 58176298 A * | 10/1983 | ............ | B66B 7/1261 |
| JP | 2011225146 A * | 11/2011 | | |
| WO | WO 2010121897 A1 * | 10/2010 | ............ | B27B 17/12 |
| WO | WO 2010122035 A1 * | 10/2010 | ............ | F16C 29/02 |

\* cited by examiner

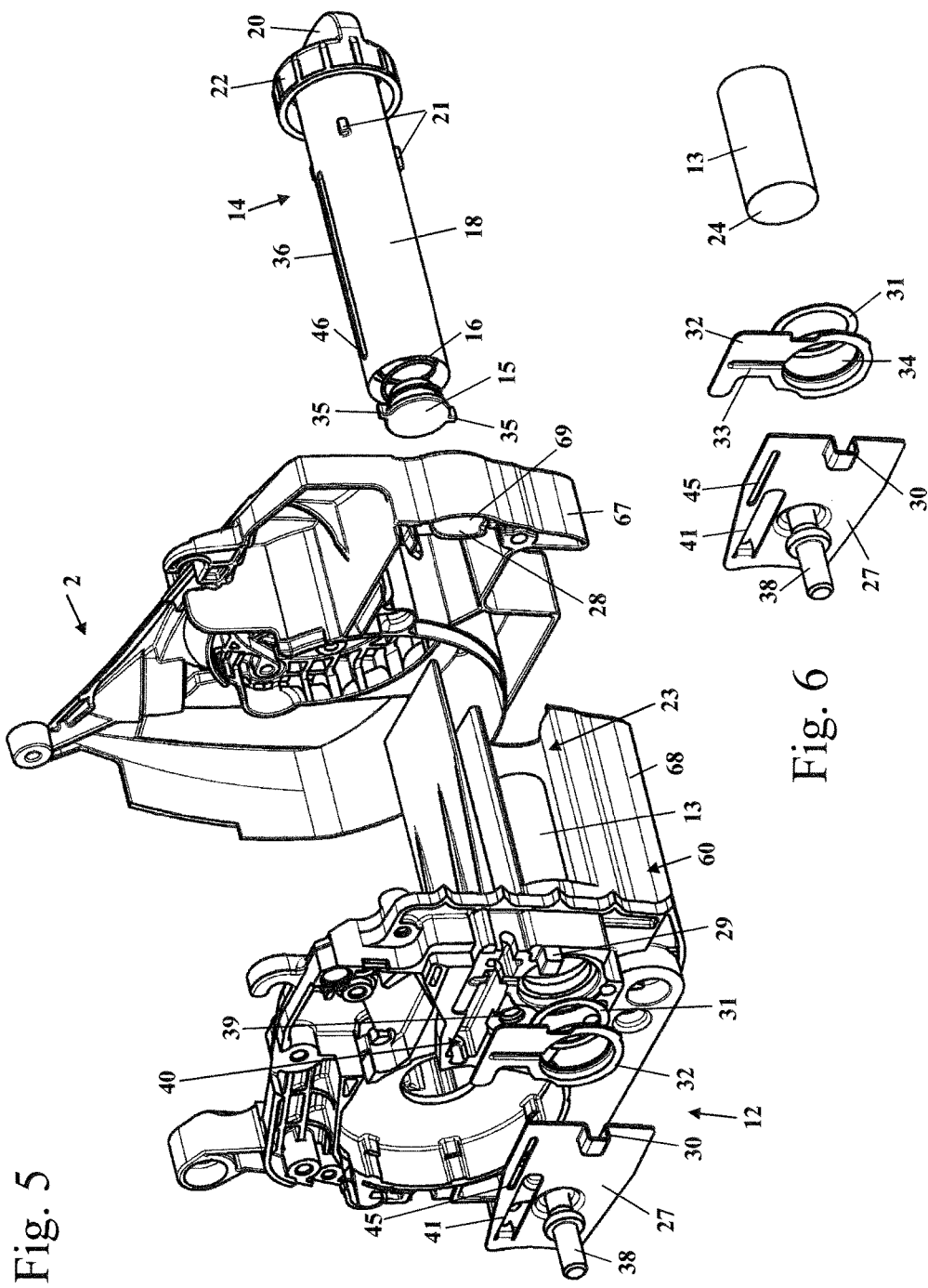

HANDHELD WORK APPARATUS

CROSS REFERENCE TO RELATED APPLICATION

This application claims priority of German patent application no. 10 2014 015 578.1, filed Oct. 15, 2014, the entire content of which is incorporated herein by reference.

BACKGROUND OF THE INVENTION

In handheld work apparatuses, for example chain saws, it is known to provide lubricating oil for lubricating the tool. The lubricating oil is delivered to the tool via a lubricating-oil pump which is comparatively complex.

DE 10 2009 034 710 B4 discloses a chain saw in which a fixed lubricant piece is used for lubricating the saw chain. The lubricant piece is pushed against the drive pinion of the saw chain of the chain saw. It has been shown that a high degree of lubricant removal can take place through the drive pinion. This results in high lubricant consumption such that the lubricant piece has to be replaced frequently. This results in frequent work interruptions. The lubricating effect is also not always sufficient.

SUMMARY OF THE INVENTION

It is an object of the invention to provide a handheld work apparatus of the generic type, the lubricating arrangement of which has a simple structure and wherein good and reliable lubrication with low lubricant consumption is achieved.

The handheld work apparatus of the invention includes: a worktool; a drive motor configured to drive the worktool; a lubricating arrangement for the worktool; the lubricating arrangement including a lubricant piece configured to be solid at 20 C; a melting chamber; the lubricant piece projecting into the melting chamber; a lubricant channel connecting the melting chamber to the worktool; a heat conducting element configured to be heated during operation of the handheld work apparatus; and, the melting chamber being at least partially delimited by the heat conducting element.

Provision is made for the lubricant piece to project into a melting chamber which is connected to the tool via at least one lubricant channel. The melting chamber is delimited at least partially by a heat conducting element which is heated during operation of the work apparatus. In the melting chamber, the lubricant piece can be melted and the lubricant reaches the tool via the lubricant channel. As a result, it is not necessary for the lubricant piece to bear directly against the tool. This prevents excessive lubricant consumption. Via the lubricant channel, the lubricant can be guided to the tool such that good lubrication of the tool occurs during operation. The heat conducting element is advantageously heated only during operation of the work apparatus, such that when the work apparatus is not in operation, the lubricant piece can solidify even in the region of the melting chamber. As a result, leaking of lubricant is easily avoided.

Advantageously, the heat conducting element is connected to at least one heat source of the work apparatus. The heat source is in particular the tool of the work apparatus. During operation, the tool heats up very quickly, and so sufficient heat is available for melting the lubricant piece in the melting chamber even after a short operating time. As a result, sufficient lubrication of the tool can be ensured easily, even after a short start-up phase. Since the heat source is the tool of the work apparatus, no additional heat source is required.

Advantageously, the lubricant piece is pushed in the direction of the melting chamber by a pretensioning device. This can ensure that sufficient lubricant is always delivered into the melting chamber. The pretensioning device is in particular a spring. This results in a simple structure. In addition or alternatively, gravity or a lever mechanism or the like can also be used as the pretensioning device. A pneumatic pretensioning device may also be practical. The lubricant piece advantageously passes into the melting chamber through an opening, wherein the contour of the opening is matched to the external contour of the lubricant piece. Provision can be made for the melted lubricant itself to seal off the lubricant piece in the opening, it being possible for some of the lubricant to pass out of the melting chamber through the opening and solidify there. A self-sealing system is formed in a simple manner as a result. However, provision can also be made for a sealing device to be arranged at the opening, the lubricant piece passing into the melting chamber through the sealing device. The sealing device is in particular a seal. The seal can be configured in a disklike manner. A tubular configuration of the seal, in which case the seal extends several millimeters into the melting chamber in the direction of movement of the lubricant piece can be advantageous, however. The seal can consist in particular of a foamed material.

Advantageously, the work apparatus has a holder for the lubricant piece, the holder being removably held on a housing of the work apparatus. In order to load a new lubricant piece, the holder can be removed from the housing and a new lubricant piece can be inserted into the holder. This results in easy handling. Advantageously, the holder includes a tubular base body which is arranged in a receptacle in the housing of the work apparatus. The receptacle is open to the environment in particular around a part of the circumference of the base body. As a result, the user can easily establish how large the lubricant piece still present in the holder is and whether it is already necessary to insert a new lubricant piece.

Advantageously, the holder includes a pressure piece which bears against the lubricant piece on the end that faces away from the melting chamber, and which is pretensioned in the direction of the melting chamber. The arrangement of the pretensioning device on the holder results in a simple structure. The pretensioning device is tensioned in particular during the insertion of the holder into the housing and/or during the insertion of a lubricant piece into the holder. The holder has in particular an end stop for the pressure piece. Advantageously, the end stop defines the end position of the pressure piece in the direction of movement of the lubricant piece into the melting chamber. As a result, even when the lubricant piece has been completely used up, the pressure piece cannot be pushed out of the holder.

Preferably, the work apparatus is a chain saw and the tool is a saw chain arranged on a guide bar. The guide bar butts in this case in particular against a side plate of the chain saw. Advantageously, the side plate forms the heat conducting element. Since the side plate, which is usually present anyway, is used as the heat conducting element, a simple structure is produced. No additional components are required for the heat conducting element. The lubricant channel is advantageously delimited by the side plate and an intermediate plate butting against the side plate. Simple channeling is realized as a result. A recess delimiting the lubricant channel is advantageously provided in the intermediate plate, the recess extending as far as a through opening in the side plate. Through the through opening, the lubricant can be fed into the lubricant opening provided in the guide bar via the opening in the side plate for liquid lubricant delivered by an oil pump. The lubricant opening and the through opening in the side plate also form sections of the lubricant channel which feeds the lubricant from the melting chamber to the saw chain.

A particularly advantageous arrangement is produced when the lubricant piece is arranged such that a longitudinal center axis of the lubricant piece extends approximately perpendicularly to the plane of the guide bar. This produces a compact structure. However, provision can also be made for the longitudinal center axis to be arranged in an inclined manner with respect to the plane of the guide bar. This can be advantageous in particular in order to be able to readily exploit the available installation space. A curved course of the feed line for the lubricant piece can also be provided when individual, for example spherical lubricant pieces are used.

Provision can be made for the heat conducting element to be heated by a heating device driven by the drive motor. Heating by the heating device can be provided in addition to or as an alternative to heating by the tool. The drive motor is in particular a combustion engine having an exhaust-gas muffler. In addition or alternatively, the heat conducting element can also be heated by the exhaust-gas muffler and/or by exhaust gases exiting the exhaust-gas muffler. It may be advantageous to combine a number of measures for heating the heat conducting element.

BRIEF DESCRIPTION OF THE DRAWINGS

The invention will now be described with reference to the drawings wherein:

FIG. 5 shows an exploded view of the lubricating device;

FIG. 6 shows an exploded view of parts of the lubricating device;

DESCRIPTION OF THE PREFERRED EMBODIMENTS OF THE INVENTION

Figure 1:
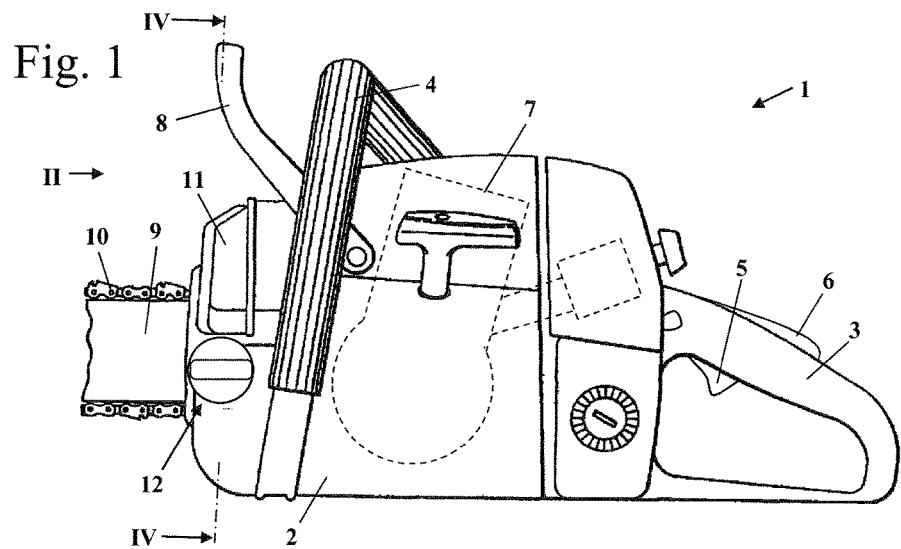
FIG. 1 is a schematic side elevation view of a chain saw.

FIG. 1 shows a chain saw 1 as an embodiment of a handheld work apparatus. The chain saw 1 has, in the embodiment, a housing 2 on which a rear handle 3 and a bale handle 4 are arranged. A drive motor 7 for driving a saw chain 10 is arranged in the housing 2. The saw chain 10 is arranged in a circulating manner on a guide bar 9. The guide bar 9 extends forward on that side of the housing 2 that faces away from the rear handle 3. The chain saw 1 has a drive motor 7 that is configured as a combustion engine in the embodiment. However, the drive motor 7 can also be an electric motor which is fed with power via a connecting cable or a rechargeable battery. The chain saw 1 can also be configured as a pole pruner in which a transmission housing, on which the guide bar 9 is held, is connected via a pole to the housing in which the drive motor is arranged.

In the embodiment, a throttle lever 5 and a throttle lever lock 6 are mounted on the rear handle 3. Arranged on that side of the bale handle 4 that faces the guide bar 9 is a hand protection 8 which advantageously serves for triggering a braking device for the saw chain 10. The chain saw 1 has an exhaust-gas muffler 11 which is arranged on that side of the housing 2 that faces away from the rear handle 3 and faces the guide bar 9. Through the exhaust gas muffler, the exhaust gases of the drive motor 7 escape into the environment. Also arranged on the housing 2 is a lubricating device 12 for the saw chain 10.

Figure 2:
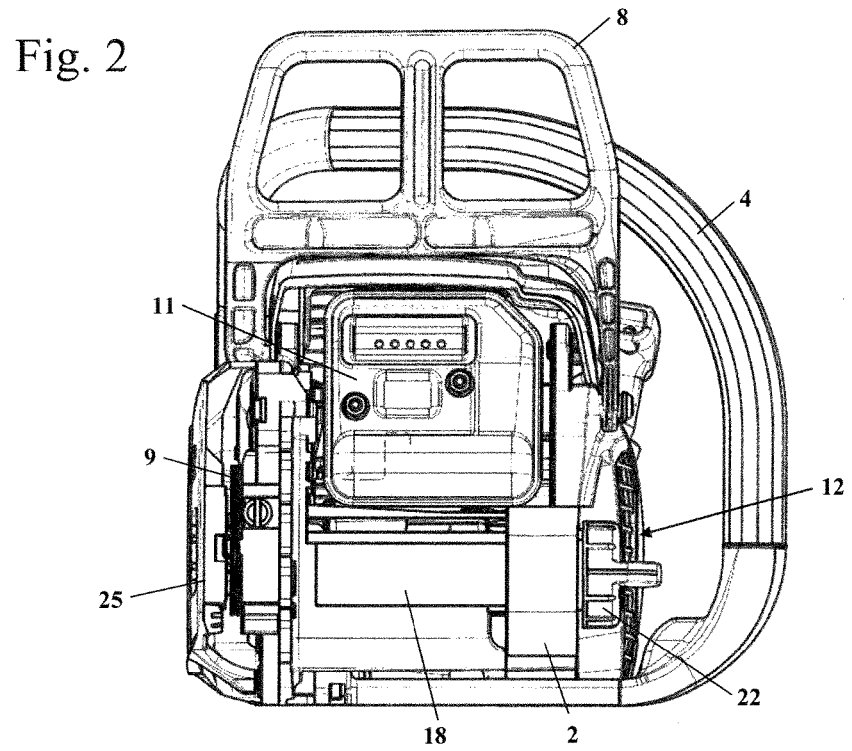
FIG. 2 shows a view of the chain saw in the direction of the arrow II in FIG. 1.
Figure 3:
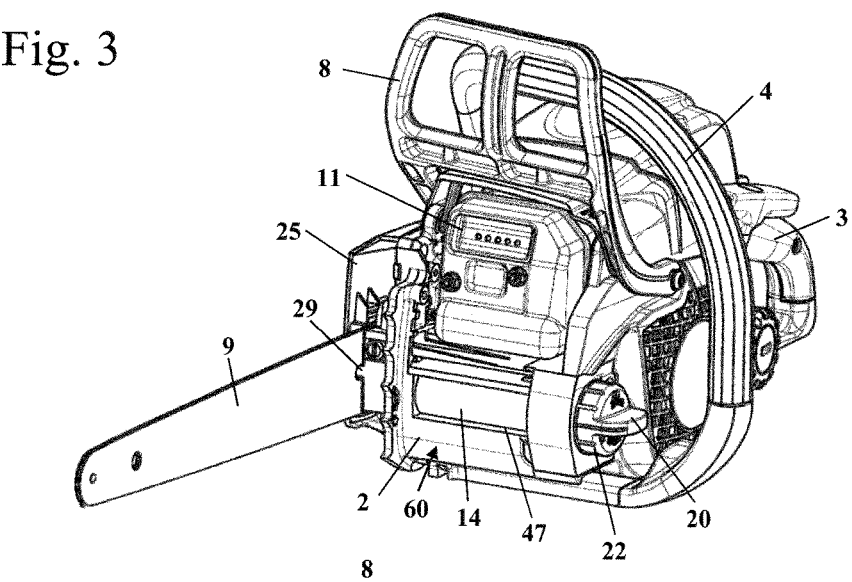
FIG. 3 shows a perspective view of the chain saw.

As FIG. 2 shows, the lubricating device 12 has a base body 18 which is configured in a cylindrical manner in the embodiment. The guide bar 9 is covered by a sprocket wheel cover 25 in the region of the housing 2. On the side facing away from the guide bar 9, the lubricating device 12 has a cover section 22 which closes off a receiving opening formed for the lubricating device 12 in the housing 2. The base body 18 is part of a holder 14 shown in FIG. 3. As FIG. 3 shows, a handle section 20, at which a user can hold the holder 14 with the cover section 22 and fix it to the housing 2 or detach it from the housing 2, is formed on the cover section 22. As FIG. 3 also shows, the housing 2 has an opening 47 which is formed at the front end 60, facing away from the rear handle, of the housing 2 and through which the holder 14 is visible.

Figure 4:
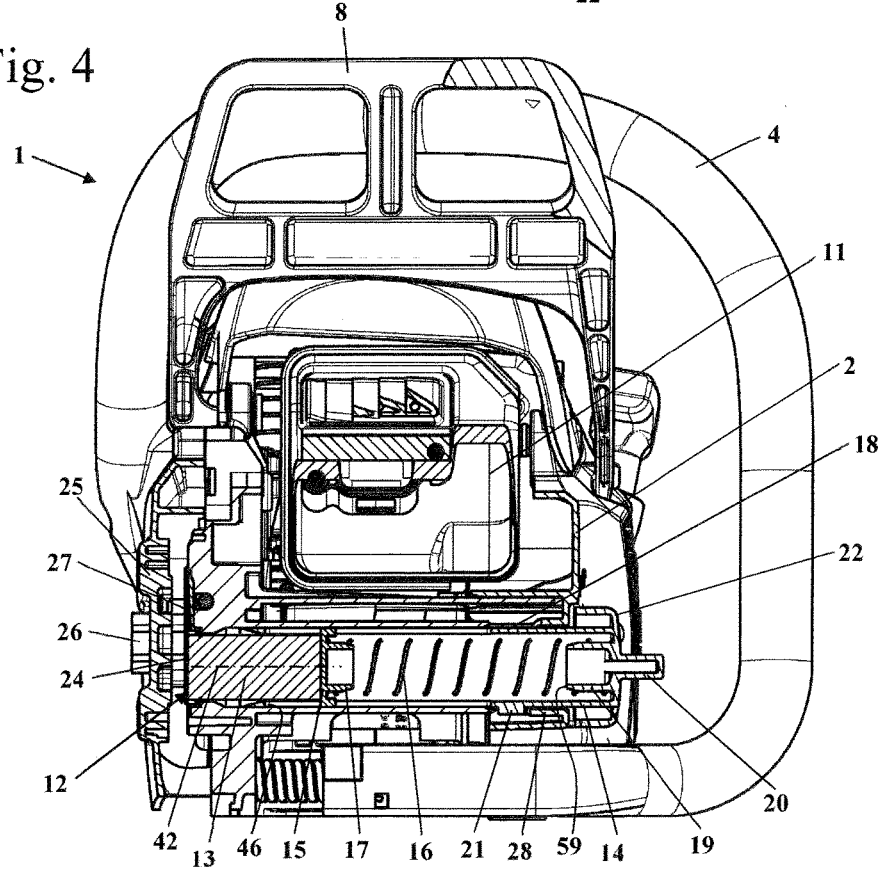
FIG. 4 shows a section along the line IV-IV in FIG. 1.

FIG. 4 shows the structure of the lubricating device 12 in detail. The base body 18 has an outwardly projecting latching lug 21 which is located behind a wall section 28 of the housing 2 and thereby fixes the base body 18 in the housing 2. The cover section 22 has a connecting piece 19 that projects into the base body 18 and at the outer circumference of which a spring 16 is held. The spring 16 is configured as a helical compression spring and butts with its other end against a pressure piece 15. The pressure piece 15 has a connecting piece 17 which is oriented in the direction of the connecting piece 19 and which projects into the interior of the spring 16 and guides the latter. The spring 16 pretensions the pressure piece 15 in the direction of the guide bar 9 (FIG. 3). The end face of the connecting piece 19 forms an end stop 59 for the connecting piece 17 of the pressure piece 15. The end stop 59 delimits the maximum insertion depth of the pressure piece 15 into the base body 18. Formed on the base body 18 is an end stop 46 for the pressure piece 15, the pressure piece 15 being pushed against the end stop 46 when the lubricant piece 13 is largely used up. The end stop 46 prevents the pressure piece 15 from being able to be pushed back out of the base body 18 by the spring 16.

Figure 9:
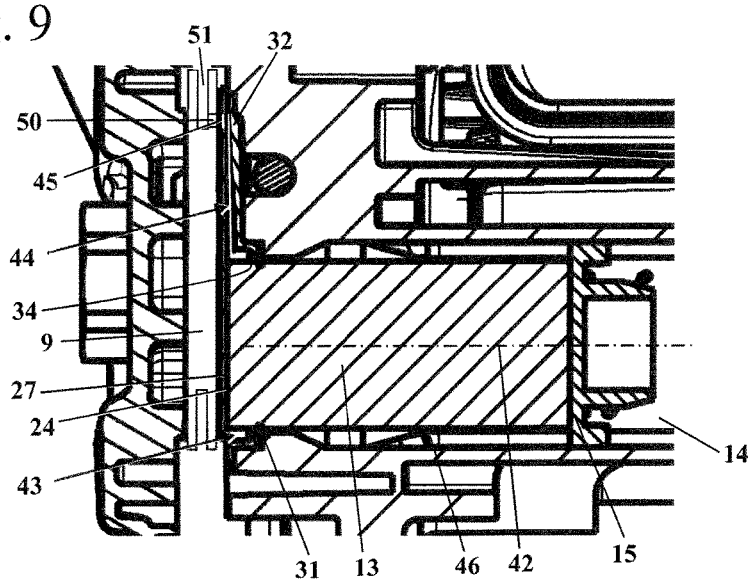
FIG. 9 is an enlarged view of the region of the melting chamber of the lubricant piece from FIG. 4.

As FIG. 4 shows, a lubricant piece 13 is arranged in the base body 18 of the holder 14. The lubricant piece 13 butts against the pressure piece 15 on that side of the pressure piece 15 that faces away from the spring 16, and is pretensioned by the spring 16 in the direction of a melting chamber 43 (FIG. 9). The lubricant piece 13 has a longitudinal center axis 42 which coincides with a longitudinal center axis of the base body 18. The lubricant piece 13 is solid at 20° C. and can consist for example at least partially of a wax. The lubricant piece 13 has an end face 24 which is pushed against a side plate 27 of the chain saw 1 by the spring 16. Clamped in between the side plate 27 and the sprocket wheel cover 25 is the guide bar 9 (FIG. 3), which is not shown in FIG. 4. The sprocket wheel cover 25 is fixed to the housing 2 by way of a fastening nut 26, shown in FIG. 4, and holds the guide bar 9 on the housing 2. The longitudinal center axis of the lubricant piece 13 extends perpendicularly to the plane of the guide bar 9 and in the transverse direction of the chain saw 1.

FIG. 5 shows the structure of the lubricating device 12 in detail. In the embodiment, the holder 14 has a plurality of latching lugs 21. The wall section 28 is formed on a housing part 67 of the housing 2. The wall section 28 has an end face, behind which the latching lugs 21 come to rest. The wall section 28 has an internal contour that deviates from a cylindrical shape, such that the latching lugs 21 can pass through the opening 69 formed in the wall section 28. Locking behind the wall section 28 takes place by rotation of the cover section 22 with the handle section 20. In the embodiment, the cylindrical base body 18 has two mutually opposite longitudinal grooves 36 of which one is shown in FIG. 5. The pressure piece 15 has outwardly projecting guide noses 35. In the embodiment, provision is made of two guide noses 35 which each project into a longitudinal groove 36. That end of the longitudinal grooves 36 that faces away from the cover section 22 forms in each case one end stop 46 for the pressure piece 15. If a lubricant piece 13 is not arranged in the holder 14, the spring 16 pushes the pressure piece 15 against the end stops 46. When a new lubricant piece 13 is loaded, the pressure piece 15 can, as a result, not be pushed out of the base body 15 by the spring 16.

As FIG. 5 also shows, the housing 2 has a second housing part 68 in which a receptacle 23 for the holder 14 is formed. The receptacle 23 is configured so as to be open towards the front end 60 of the housing 2, such that the base body 18 is visible from the outside around a part of its circumference. The lubricant piece 13, which is shown in the receptacle 23 in the illustration in FIG. 5, is arranged in the holder 14.

As FIG. 5 shows, the housing part 68 has, at its end face that faces away from the housing part 67, a recess 40 which serves to receive a chain-tensioning device, which is not shown. The side plate 27 has a longitudinal groove 41 through which the chain-tensioning device acts on the guide bar 9 (FIG. 3), which is not shown in FIG. 5. The side plate 27 also has a through opening 45 which is likewise configured as a longitudinal slot and which serves for the passage of lubricant to the guide bar 9. FIG. 5 also shows a threaded bolt 38 which has been screwed into a threaded opening 39 in the housing 2 and on which the fastening nut 26, shown in FIG. 4, is fixed. In order to orient the longitudinal direction of the side plate 27 and the guide bar 9, use is made of a nose 29 on the housing 2, the nose 29 projecting into a receptacle 30 in the side plate 27. The nose 29 projects with the receptacle 30 in the side plate 27 into the guide bar 9 (FIG. 3) and as a result secures the position of the guide bar 9.

As FIG. 5 shows, an intermediate plate 32 is provided between the housing part 68 and the side plate 27. Arranged on that side of the intermediate plate 32 that faces away from the side plate 27 is a seal 31 which is configured as an annular disk.

As FIG. 6 shows, the end face 24 of the lubricant piece 13 projects towards the side plate 27. In this case, the lubricant piece 13 projects through the seal 31 and through an opening 34 in the intermediate plate 32. The intermediate plate 32 has, on its side facing the side plate 27, a recess 33 which extends as far as the through opening 45 in the side plate 27. The recess 33 forms with the side plate 27 a lubricant channel 44, which is shown in FIG. 9.

Figure 7:
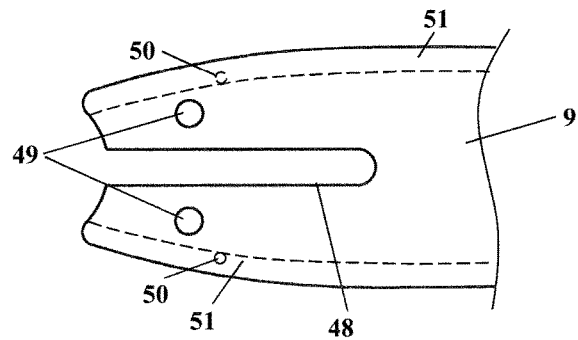
FIG. 7 is a schematic of a detail of the guide bar of the chain saw.
Figure 8:
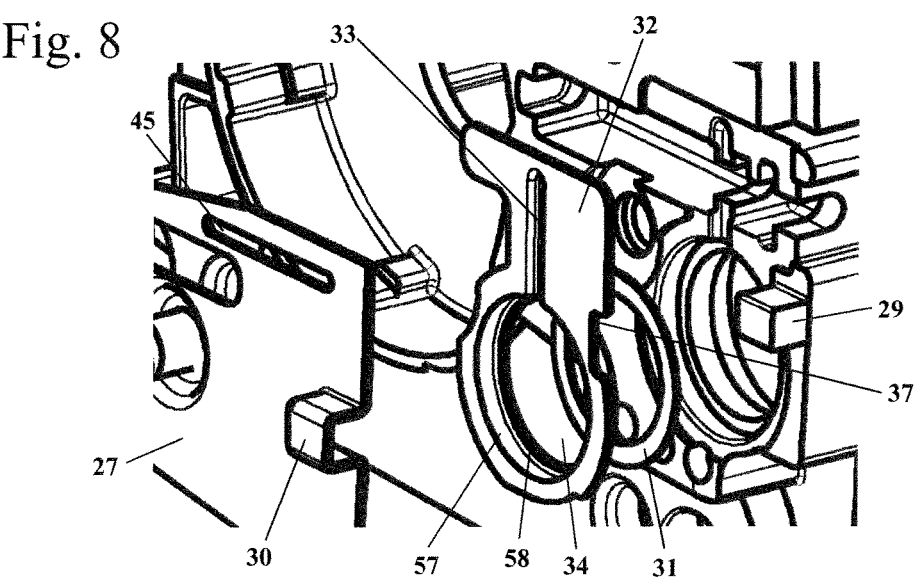
FIG. 8 shows an enlarged view of the region of the melting chamber of the lubricating device from FIG. 5.

As FIG. 7 shows, the guide bar 9 has a longitudinal groove 48 which extends from an end face of the guide bar 9 in the longitudinal direction of the guide bar 9. The longitudinal groove 48 can also be configured in a closed manner towards the side facing the drive pinion. The threaded bolt 38 and the nose 29 with the receptacle 30 project into the longitudinal groove 48. The position of the guide bar 9 on the housing 2 is fixed via the longitudinal groove 48. The guide bar 9 has two tensioning openings 49 into which a chain-tensioning device can engage. The guide bar 9 also has two lubricant openings 50, which extend from the outside of the guide bar 9 into a guide groove 51 in the guide bar 9. The saw chain 10 (FIG. 1) is guided in the guide groove 51. During operation, one of the lubricant openings 50 is located next to the through opening 45 in the side plate 27 (FIG. 8). The lubricant openings 50 and the tensioning openings 49 are configured such that the guide bar 9 can be arranged in two positions, rotated about its longitudinal axis, on the side plate 27, wherein in each case one of the lubricant openings 50 and one of the tensioning openings 49 is used.

As FIG. 8 shows, the intermediate plate 32 has, at the outer circumference of the opening 34, a cylindrical section 57 which extends from the plane of the intermediate plate 32 to the side facing away from the side plate 27. The cylindrical section 57 is adjoined by an inwardly projecting edge 58, against which the seal 31 butts. The intermediate plate 32 has a cutout 37 in which the nose 29 partially comes to rest. The nose 29 thus also fixes the position of the intermediate plate 32.

As FIG. 9 shows, a melting chamber 43, into which the lubricant piece 13 projects, is formed between the intermediate plate 32 and the side plate 27. Towards the side facing the holder 14, the melting chamber 43 is sealed off by the seal 31. The opening 34, through which the lubricant piece 13 passes into the melting chamber 43, is configured in a round manner, just like the outer circumference of the lubricant piece 13. As FIG. 9 shows, the inside diameter of the opening 34 is only slightly larger than the outside diameter of the lubricant piece 13. Since the contour of the lubricant piece 13 matches the opening 34, it is also possible to dispense with a seal 31. As FIG. 9 shows, a lubricant channel 44, which is delimited by the recess 33 in the intermediate plate 32 (FIG. 8), is formed between the intermediate plate 32 and the side plate 27. The lubricant channel 44 extends between the side plate 27 and the intermediate plate 32, through the through opening 45 in the side plate 27 and the lubricant opening 50 in the guide bar 9, and into the guide groove 51.

During operation, the guide bar 9 heats up very greatly because of the friction brought about by the saw chain 10.

This heat is transmitted to the side plate 27, which butts against the guide bar 9. The side plate 27 serves as a heat conducting element and heats the end face 24, butting against the side plate 27 or located a short distance away from the side plate 27, of the lubricant piece 13, which is melted as a result. Advantageously, the lubricant piece 13 comprises at least partially wax or stearin wax. Preferably, the lubricant piece 13 melts at temperatures above 40° C., in particular above about 50° C. However, it can also be advantageous to use a lubricant piece which melts only at temperatures above about 70° C. As a result, it is possible to ensure that the lubricant piece 13 does not melt at the temperatures that usually prevail when the chain saw 1 is at a standstill, even when the chain saw 1 is set down in the sun. During operation, high temperatures, which are conducted to the melting chamber 43 via the side plate 27, are reached rapidly, and so melting of the lubricant piece 13 at its end face 24 is ensured during operation. As a result, liquid lubricant is arranged in the melting chamber 43, and is guided into the guide groove 51 via the lubricant channel 44. When the saw chain is at a standstill, the guide bar 9 and the side plate 27 cool down. As a result, the lubricant can solidify rapidly in the lubricant channel 44 and in the melting chamber 43. Since the lubricant channel 44 is delimited by the side plate 27, the lubricant disposed here solidifies comparatively quickly after the saw chain 10 comes to standstill, and so a leak of lubricant into the environment can be largely avoided. The side plate 27 thus forms a heat conducting element which heats up rapidly during operation with the saw chain 10 running and cools down rapidly with the saw chain at standstill. As a result, during operation, rapid delivery of lubricant is achieved and with the saw chain at standstill, rapid solidification of the lubricant in the lubricant channel 44 is achieved, and so a leak of lubricant into the environment is largely avoided.

In order to achieve rapid heating of that region of the lubricant piece 13 that projects into the melting chamber 43, a material with good heat conductivity, for example aluminum or steel, can be used for the heat conducting element, in particular the side plate 27. As a result of the arrangement, configuration and selection of a suitable material for the heat conducting element, desired heating of the melting chamber 43 can be set easily. The lubricant piece 13 is in this case melted only in the region projecting into the melting chamber 43. As a result, comparatively little heat input is sufficient in order to ensure good lubrication.

Figure 10:
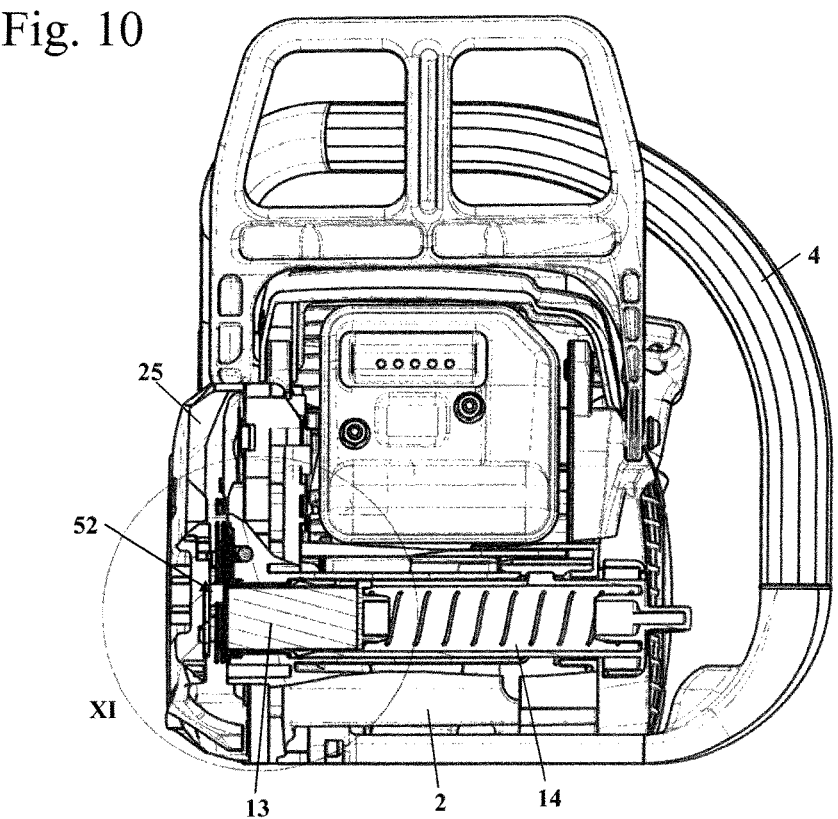
FIG. 10 shows a section through an embodiment of a chain saw.
Figure 11:
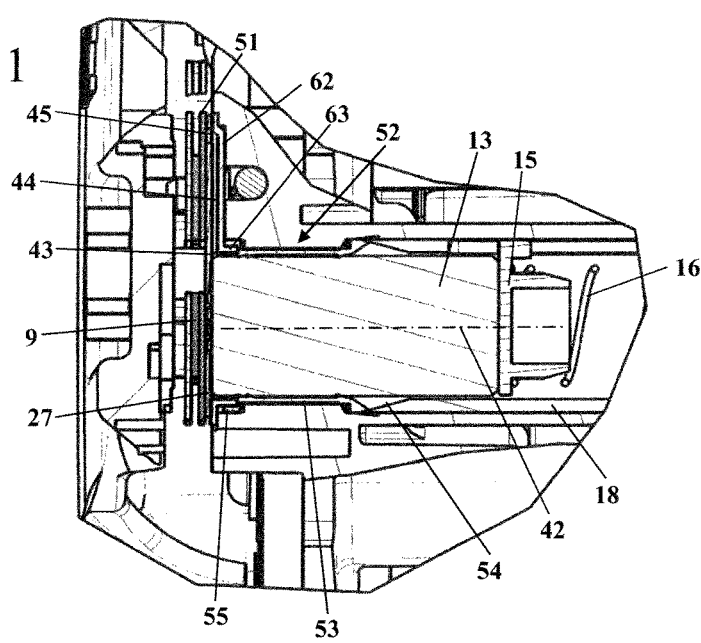
FIG. 11 shows the region XI from FIG. 10 in an enlarged illustration.
Figure 12:
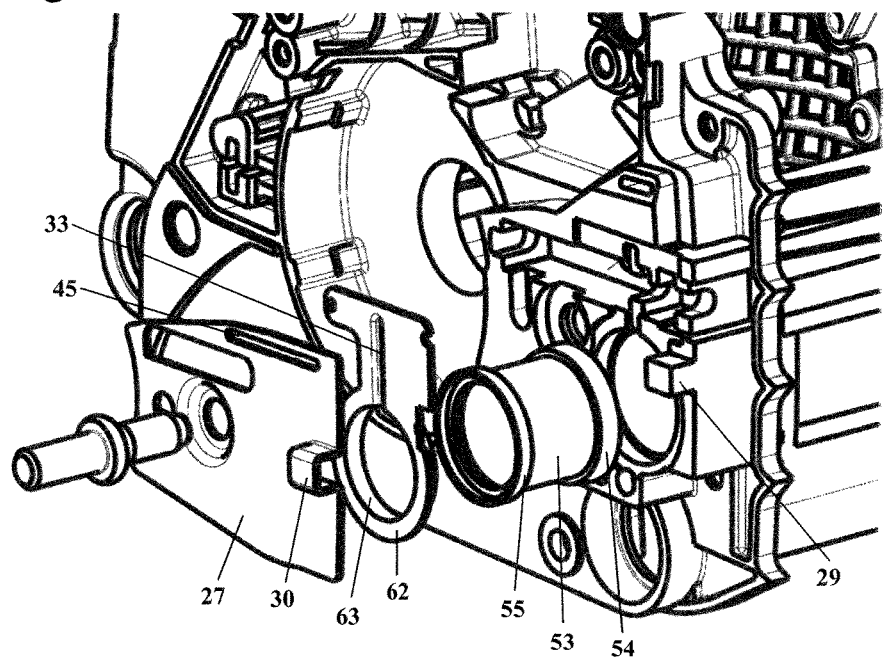
FIG. 12 shows an exploded view of the region of the melting chamber of the lubricating device from FIG. 11.

FIG. 10 shows an embodiment of a lubricating device 52. The structure of the lubricating device 52 corresponds substantially to the structure of the lubricating device 12. Identical reference signs denote mutually corresponding elements in all the figures. As FIG. 11 shows, the lubricating device 52 has an intermediate plate 62 against which a seal 53 butts. The seal 53 is configured as a cylindrical body and extends a number of millimeters, in the embodiment more than one centimeter, in the direction of the longitudinal center axis 42 of the lubricant piece 13 at the outer circumference of the lubricant piece 13. The seal 53 is advantageously formed from a soft, smooth material, for example silicone, and seals the melting chamber 43 off towards the side facing the pressure piece 15 and the holder 14. As FIG. 11 shows, the intermediate plate 62 has an edge 63, which is also shown in FIG. 12 and over which an edge 55 of the seal 53 engages. On the side facing away from the intermediate plate, the seal 53 has an edge 54 which is formed in a beveled manner and which projects into the base body 18 of the holder 14. The configuration of the lubricant channel 44 corresponds to the configuration of the lubricant device 52.

Figure 13:
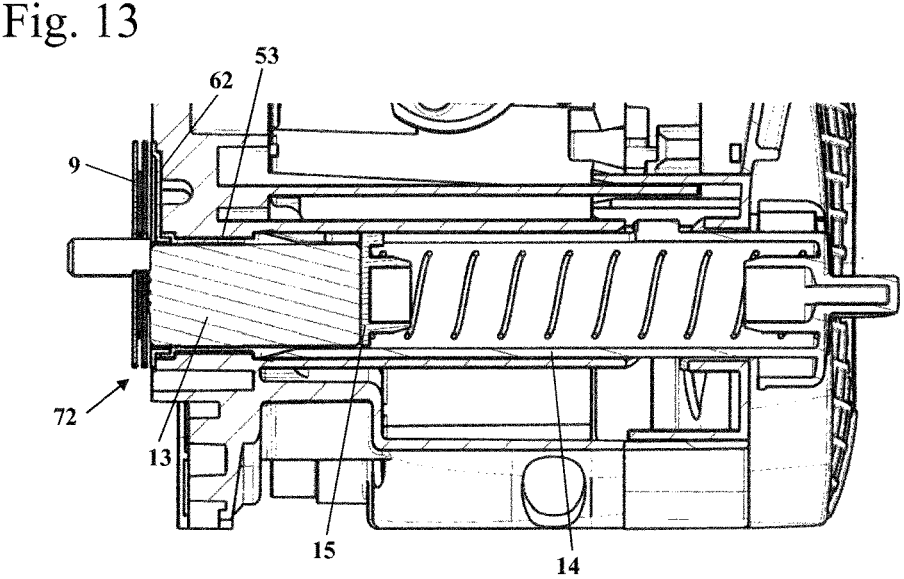
FIG. 13 shows a section view of a detail of an embodiment of a lubricating device of a chain saw.
Figure 14:
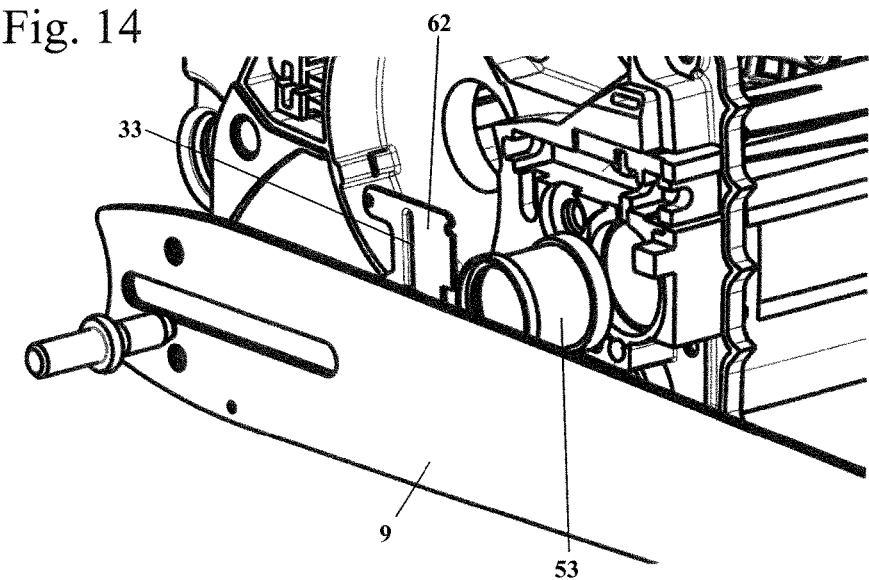
FIG. 14 shows an exploded view of the lubricating device from FIG. 13.
Figure 15:
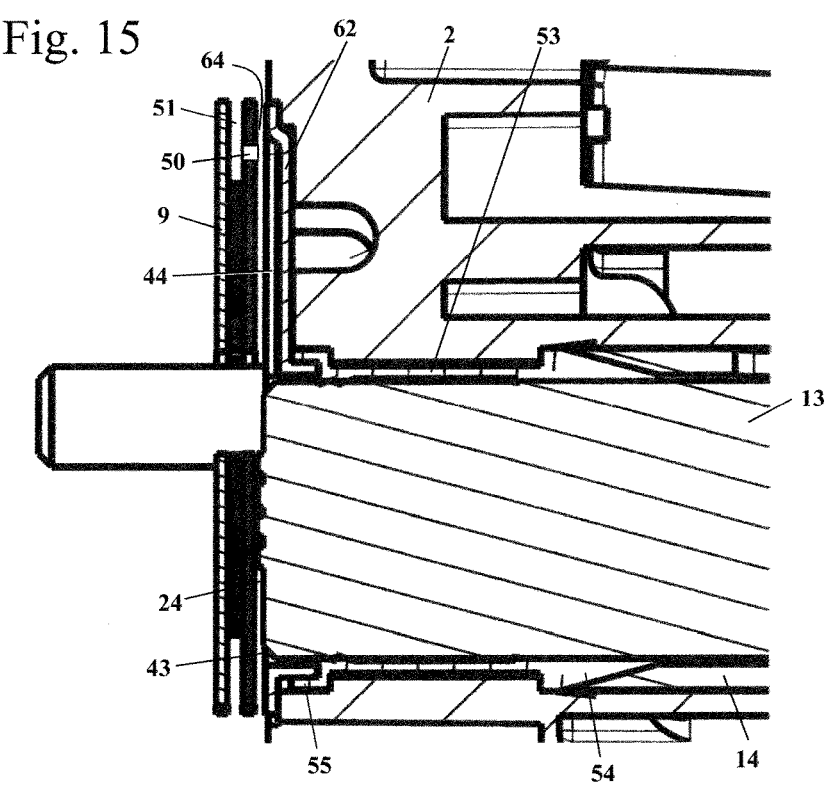
FIG. 15 shows an enlarged view of a detail of the region of the melting chamber of the lubricating device from FIG. 13.

FIGS. 13 to 15 show an embodiment of a lubricating device 72 in which the intermediate plate 62 butts directly against the guide bar 9. In FIGS. 13 and 15, a gap is shown between the guide bar 9 and the intermediate plate 62 in order to simplify the illustration. This gap is advantageously dispensed with, such that the intermediate plate 62 butts against the guide bar 9. As FIG. 15 shows, the melting chamber 43 is delimited by the guide bar 9 and the intermediate plate 62. In this case, the guide bar 9 forms the heat conducting element, which conducts the heat generated by the saw chain 10 (FIG. 1) to the melting chamber 43 and as a result heats and liquefies the lubricant piece 13. The end face 24 of the lubricant piece 13 projects into the melting chamber 43 as far as the guide bar 9. The lubricant channel 44 is delimited by the intermediate plate 62 and the flat side 64, facing the housing 2, of the guide bar 9. Via the lubricant opening 50 in the guide bar 9, the lubricant passes into the guide groove 51. As FIG. 15 also shows, a seal 53 is arranged between the intermediate plate 62 and the holder 14.

Figure 16:
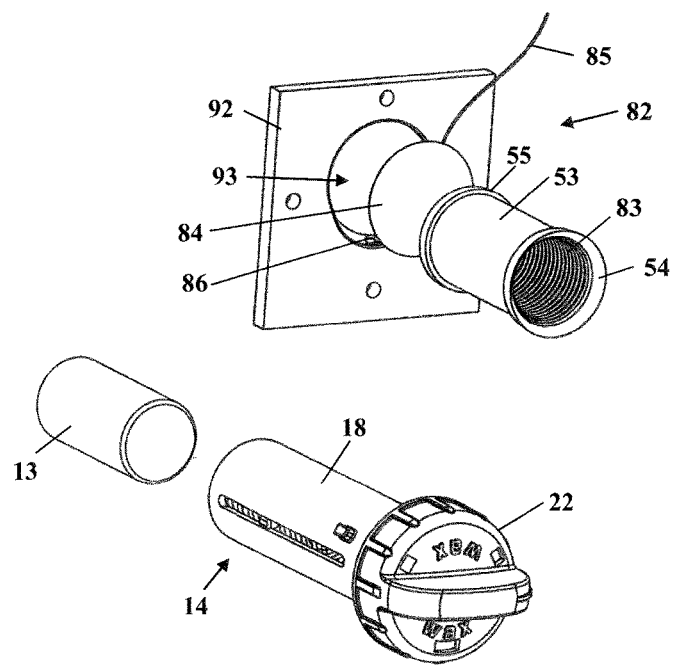
FIG. 16 shows an exploded view of an embodiment of a lubricating device.

Provided in the embodiment shown in FIG. 16 is a lubricant device 82 which has a heating element 84. The heating element 84 delimits, together with an intermediate plate 92, a melting chamber 93. The heating element 84 has a connecting cable 85 for connecting to an electrical power source. The electrical power source can be for example a generator driven by a drive motor 7. The ignition device of a drive motor 7 configured as a combustion engine can also be used as an energy supply for the heating element 84. As FIG. 16 shows, the seal 53, against which the housing part 18 of the holder 14 butts, is arranged at the heating element 84. As FIG. 16 shows, in the embodiment, the seal 53 has on its inner side a rib structure 83 which advantageously consists of a multiplicity of circular, inwardly projecting ribs. As a result, the sealing action is improved. As FIG. 16 also shows, the intermediate plate 92 has a lubricant channel 86, which is configured as a channel in the intermediate plate 92 in the embodiment and which leads to a lubricant opening 50, not shown in FIG. 16, in the guide bar 9.

Figure 17:
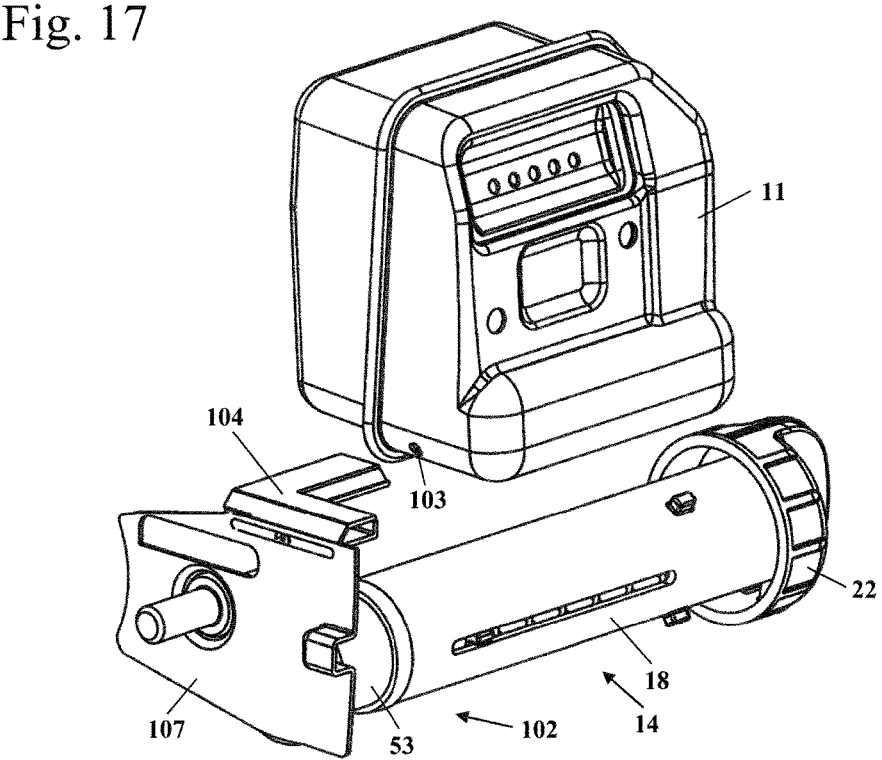
FIG. 17 and FIG. 18 show exploded views of a further embodiment of a lubricating device; and, FIG. 19 shows an exploded view of a further embodiment of a lubricating device.
Figure 18:
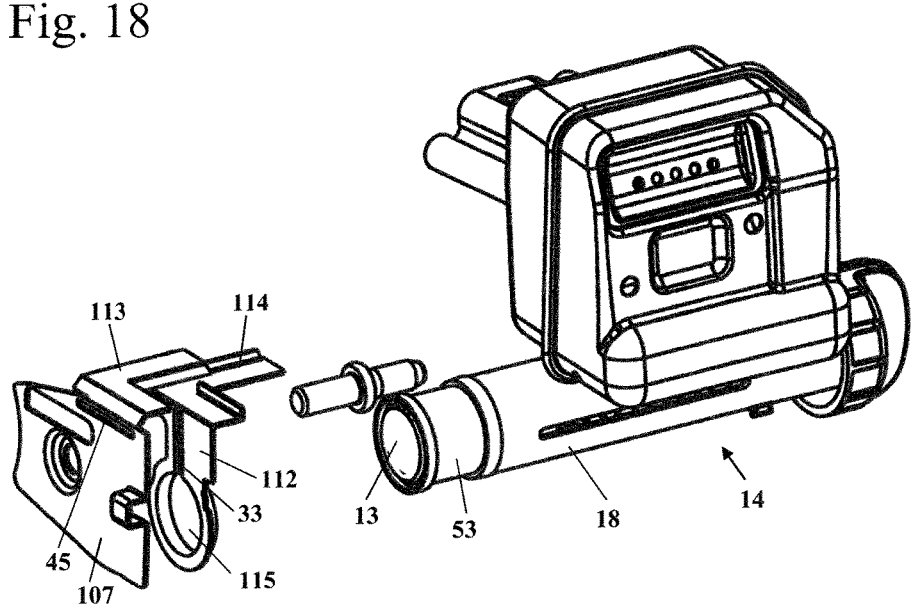

In the embodiment of a lubricating device 102 that is shown in FIGS. 17 and 18, provision is made to use the exhaust gases of the combustion engine to heat the lubricant piece 13. To this end, the exhaust-gas muffler 11 has an opening 103 which is adjoined by an exhaust channel 104. A side plate 107, against which a lubricant piece 13 that is guided in the holder 14 and is shown in FIG. 18 butts, is heated by the exhaust gases guided through the exhaust channel 104. In this case, the lubricant piece 13 is guided through a seal 53 and projects through an opening 115 in the intermediate plate 112 into a melting chamber delimited by the intermediate plate 112 and the side plate 107. The intermediate plate 112 has a recess 33, which, together with the side plate 107, delimits a lubricant channel which leads to the guide bar 9 through a through opening 45 in the side plate 107. As FIG. 18 shows, the exhaust channel 104 is formed by a first delimiting wall 113 and a second delimiting wall 114. The first delimiting wall 114 is integrally formed on the side plate 107 in the embodiment, and the second delimiting wall 114 on the intermediate plate 112. In this way, good heating of the side plate 107 and intermediate plate 112 is achieved in a simple manner.

Figure 19:
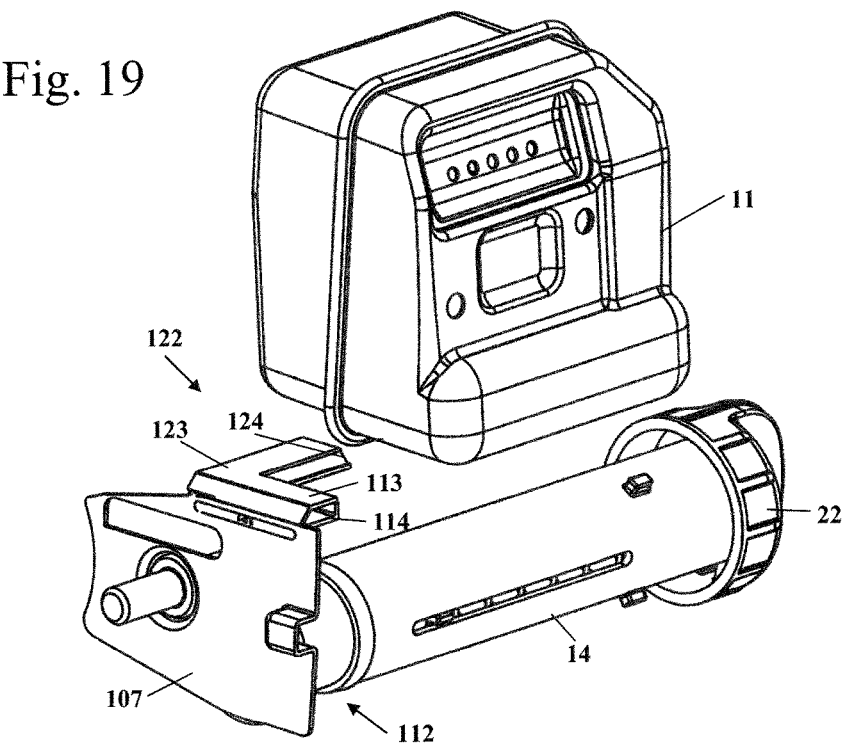

A lubricating device 122 having a heat conducting element 123 is shown in the embodiment shown in FIG. 19. The heat conducting element 123 has a contact contour 124 for contact with an exhaust-gas muffler 11. As a result, the heat conducting element 123 is heated by the exhaust-gas muffler 11 and the exhaust gases flowing through the exhaust-gas muffler 11. In the embodiment, the heat conducting element 123 is constructed from a first delimiting wall 113 and a second delimiting wall 114. As in the lubricating device 102, the first delimiting wall 113 is integrally formed on the side plate 107 and the second delimiting wall 114 on an intermediate plate 112, which is not shown in FIG. 19. However, some other configuration of the heat conducting element 123 may be advantageous.

Rather than a single lubricating piece 13, provision can be made to use a plurality of lubricant pieces. For example, a multiplicity of balls of lubricant, for example wax, can be provided as lubricant piece. As a result, the holder for the lubricant pieces can be for example a curved channel or the like. As a result, good exploitation of the available installation space can be achieved. When a plurality of for example spherical lubricant pieces are used, a seal is preferably arranged at the entry to the melting chamber, the seal extending over a plurality of the lubricant pieces in order to ensure good sealing.

Provision can also be made for the melting chamber to be delimited by the guide bar itself and for the lubricant channel, which transports the lubricant from the melting chamber to the guide groove, to be formed in the guide bar itself.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
a worktool;
a drive motor configured to drive said worktool;
a lubricating arrangement for said worktool;
said lubricating arrangement including a lubricant piece configured to be solid at 20° C.;
said lubricating arrangement including a melting chamber;
said lubricant piece having a projection projecting into said melting chamber;
said lubricating arrangement including a lubricant channel connecting said melting chamber to said worktool;
said lubricating arrangement including a heat conducting element configured to be heated during operation of the handheld work apparatus; and,
said melting chamber being at least partially delimited by said heat conducting element such that said projection of said lubricant piece can be heated and melted in said melting chamber and be guided to said worktool through said lubricant channel.

2. The handheld work apparatus of claim 1, wherein said worktool is connected to said heat conducting element to heat said heat conducting element during operation of the handheld work apparatus.

3. The handheld work apparatus of claim 1, wherein said lubricating arrangement includes a pre-tensioning device configured to push said lubricant piece in a direction toward said melting chamber.

4. The handheld work apparatus of claim 1, wherein:
said lubricant piece has an outer contour;
said melting chamber defines an opening and,
said opening having an opening contour adapted to said outer contour of said lubricant piece.

5. The handheld work apparatus of claim 4 further comprising a sealing arrangement arranged at said opening.

6. The handheld work apparatus of claim 1 further comprising:
a housing;
said work tool being arranged on said housing;
said drive motor being arranged in said housing;
said melting chamber of said lubricating arrangement being arranged in said housing; and,
said lubricating arrangement including a holder releasably held on said housing so as to be removable therefrom and configured for accommodating said lubricant piece.

7. The handheld work apparatus of claim 6, wherein:
said housing includes a receptacle;
said holder includes a tubular base body; and,
said tubular base body is arranged in said receptacle when said holder is held on said housing.

8. The handheld work apparatus of claim 7, wherein said receptacle includes an opening to the ambient, said opening being arranged at a portion of a circumference of said tubular base body.

9. The handheld work apparatus of claim 6, wherein:
said lubricant piece has an end facing away from said melting chamber;
said lubricating arrangement includes a pressure piece configured to contact said lubricant piece at said end thereof facing away from said melting chamber; and,
said lubricating arrangement includes biasing means for pretensioning said pressure piece toward said melting chamber.

10. The handheld work apparatus of claim 9, wherein said holder includes at least one end stop for said pressure piece.

11. The handheld work apparatus of claim 1, wherein the handheld work apparatus is a chain saw, the handheld work apparatus further comprising:
said heat conducting element is configured as a side plate; and,
said worktool includes a guide bar contacting said side plate and a saw chain arranged circumferentially on said guide bar.

12. The handheld work apparatus of claim 11 further comprising:
an intermediate plate contacting said side plate; and,
said lubricant channel being delimited by said intermediate plate and side plate.

13. The handheld work apparatus of claim 12, wherein:
said side plate has a through-opening formed therein;
said intermediate plate has a recess formed therein delimiting said lubricant channel; and,
said recess extends up to said through-opening.

14. The handheld work apparatus of claim 11, wherein:
said guide bar defines a plane; and,
said lubricant piece defines a longitudinal center axis arranged approximately perpendicular to said plane.

15. The handheld work apparatus of claim 1 further comprising a heating device configured to be operated by said drive motor and to heat said heat conducting element.

16. The handheld work apparatus of claim 1, wherein:
said drive motor is a combustion engine having an exhaust-gas muffler; and,
said heat conducting element is heated by at least one of said exhaust-gas muffler and exhaust gas exiting said exhaust-gas muffler.

* * * * *